United States Patent
Noguchi et al.

(10) Patent No.: US 10,014,555 B2
(45) Date of Patent: Jul. 3, 2018

(54) LITHIUM SECONDARY BATTERY AND PRODUCTION METHOD THEREFOR

(71) Applicant: NEC Corporation, Tokyo (JP)

(72) Inventors: Takehiro Noguchi, Tokyo (JP); Hideaki Sasaki, Tokyo (JP); Makiko Takahashi, Tokyo (JP); Yuukou Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 14/421,523

(22) PCT Filed: Jul. 31, 2013

(86) PCT No.: PCT/JP2013/070804
§ 371 (c)(1),
(2) Date: Feb. 13, 2015

(87) PCT Pub. No.: WO2014/027572
PCT Pub. Date: Feb. 20, 2014

(65) Prior Publication Data
US 2015/0236376 A1    Aug. 20, 2015

(30) Foreign Application Priority Data

Aug. 16, 2012  (JP) .................. 2012-180644

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2220/30* (2013.01); *H01M 2300/0025* (2013.01); *Y10T 29/49108* (2015.01)

(58) Field of Classification Search
None
See application file for complete search history.

(56) References Cited

U.S. PATENT DOCUMENTS 5,714,277 A * 2/1998 Kawakami .......... H01M 2/1686
429/129
5,830,600 A   11/1998 Narang et al.
(Continued)

FOREIGN PATENT DOCUMENTS

CN     1220029 A    6/1999
CN  101882696 A   11/2010
(Continued)

OTHER PUBLICATIONS

Ueda et al. "Solid-State Redox Reactions of LiNi1/2Co1/2O2 (R3m) for 4 Volt Secondary Lithium Cells" J. Electrochem. Soc. vol. 141 No. 8 Aug. 1994.*
(Continued)

*Primary Examiner* — Wojciech Haske
(74) *Attorney, Agent, or Firm* — Finnegan, Henderson, Farabow, Garrett & Dunner, L.L.P.

(57) ABSTRACT

An embodiment of the present invention relates to a lithium secondary battery comprising a nonaqueous electrolytic solution comprising a phosphate compound represented by the following general formula (1): $O=P(O-R_1)(O-R_2)(O-R_3)$ (1), wherein $R_1$, $R_2$, and $R_3$ are each alkyl group or the like or a group comprising an ether bond represented by $-R_4-O-R_5$ ($R_4$ represents alkylene group, and $R_5$ represents alkyl group), and at least one of $R_1$, $R_2$, and $R_3$ is a group comprising an ether bond, and at least one of $R_1$, $R_2$, and $R_3$ contains fluorine, and a positive electrode active material having a charge and discharge region of 4.5 V or more versus lithium.

13 Claims, 1 Drawing Sheet

(56) References Cited

U.S. PATENT DOCUMENTS

| | | | |
|---|---|---|---|
| 2002/0192564 A1* | 12/2002 | Ota | H01M 4/0404 |
| | | | 429/324 |
| 2005/0123834 A1* | 6/2005 | Noguchi | H01M 4/505 |
| | | | 429/326 |
| 2010/0173186 A1* | 7/2010 | Kim | H01M 10/052 |
| | | | 429/129 |

FOREIGN PATENT DOCUMENTS

| | | |
|---|---|---|
| JP | 10-189038 | 7/1998 |
| JP | 2000-348764 | 12/2000 |
| JP | 2001-516492 | 9/2001 |
| JP | 2001-345120 | 12/2001 |
| JP | A-2002-319431 | 10/2002 |
| JP | 2003-208815 | 7/2003 |
| JP | 2012-84384 | 4/2012 |
| WO | WO 2012/077712 A1 | 6/2012 |

OTHER PUBLICATIONS

Chinese Office Action issued by the Chinese Patent Office in counterpart Chinese Patent Application No. 201380043891.2, dated May 23, 2016.
International Search Report dated Sep. 3, 2013 in corresponding PCT International application.
Decision to Grant a Patent, issued by the Japanese Patent Office dated Jan. 16, 2018 in counterpart Japanese Application No. 2014-530516.

* cited by examiner

LITHIUM SECONDARY BATTERY AND PRODUCTION METHOD THEREFOR

CROSS-REFERENCE TO RELATED PATENT APPLICATIONS

This application is a National Stage Entry of International Application No. PCT/JP2013/070804, filed Jul. 31, 2013, which claims priority from Japanese Patent Application No. 2012-180644, filed Aug. 16, 2012. The entire contents of the above-referenced applications are expressly incorporated herein by reference.

TECHNICAL FIELD

The present invention relates to a lithium secondary battery.

BACKGROUND ART

Lithium secondary batteries are widely utilized in portable electronic equipment, personal computers, and the like. While miniaturization and weight reduction are required for the lithium secondary batteries, increasing the energy density is an important problem to be solved.

There are several methods for increasing the energy density of a lithium secondary battery, and among them, increasing the operating voltage of a battery is effective. A lithium secondary battery using lithium cobaltate or lithium manganate as a positive electrode active material has an average operating voltage of 3.6 to 3.8 V (4 V class) versus a metal lithium reference. This is because the operating voltage is defined by the oxidation-reduction reaction of cobalt ions or manganese ions ($Co^{3+} \leftarrow \rightarrow Co^{4+}$ or $Mn^{3+} \leftarrow \rightarrow Mn^{4+}$).

On the other hand, for example, a spinel compound in which a part of manganese in lithium manganate is replaced by nickel or the like, specifically $LiNi_{0.5}Mn_{1.5}O_4$ or the like, shows a potential plateau in a region of 4.5 V or more. Therefore, by using these spinel compound as a positive electrode active material, 5 V class operating voltage can be achieved. In a positive electrode using the spinel compound, manganese is present in the tetravalent state, and the operating voltage of the battery is defined by the oxidation-reduction of $Ni^{2+} \leftarrow \rightarrow Ni^{4+}$ instead of the oxidation-reduction of $Mn^{3+} \leftarrow \rightarrow Mn^{4+}$.

$LiNi_{0.5}Mn_{1.5}O_4$ has a capacity of 130 mAh/g or more and an average operating voltage of 4.6 V or more versus metal lithium, and has smaller lithium absorbing capacity than $LiCoO_2$ but has higher energy density than $LiCoO_2$. For such a reason, $LiNi_{0.5}Mn_{1.5}O_4$ is promising as a positive electrode material.

However, in a battery using a high potential positive electrode active material, such as $LiNi_{0.5}Mn_{1.5}O_4$, $Li(Li_x Ni_y Mn_{1-x-y})O_2$ (0.1<x<0.3, and 0.1<y<0.4), or $LiCoPO_4$, the operating voltage is higher than in a battery using $LiCoO_2$, $LiMn_2O_4$, or the like for a positive electrode active material, and on the other hand, a problem is that the decomposition reaction of the electrolytic solution proceeds easily in the contact portion between the positive electrode and the electrolytic solution, and the life shortens.

As techniques for improving the life of a battery, many examples of additives used in electrolytic solutions are reported. Many electrolytic solution additives form a film on the negative electrode to reduce the reactivity between the electrolytic solution solvent and the negative electrode and improve life. When a positive electrode operating at high voltage is used, the additive component remaining in the electrolytic solution reacts with the high potential positive electrode, which may cause the lowering of the capacity retention ratio and the generation of gas.

Patent Literature 1 describes a polymer electrolyte comprising a phosphate ester having ether group. Patent Literature 2 describes a nonaqueous solvent comprising a phosphate compound having a group comprising an ether bond. In addition, Patent Literature 3 describes a nonaqueous electrolytic solution comprising a phosphate ester having ether group and a halogen atom-substituted alkyl group.

CITATION LIST

Patent Literature

Patent Literature 1: Japanese Patent Laid-Open No. 2003-208815
Patent Literature 2: Japanese Patent Laid-Open No. 10-189038
Patent Literature 3: Japanese Patent Laid-Open No. 2001-345120

SUMMARY OF INVENTION

Technical Problem

However, for the nonaqueous electrolytic solutions described in Patent Literatures 1 to 3, study is insufficient in terms of life improvement in a lithium secondary battery comprising a positive electrode operating at high voltage, and there is room for improvement for an additive having further oxidation resistance. Accordingly, it is an object of this embodiment to provide a lithium secondary battery in which life characteristics at high voltage are improved.

Solution to Problem

The present embodiment relates to:
a lithium secondary battery comprising a positive electrode comprising a positive electrode active material and a nonaqueous electrolytic solution, wherein
the nonaqueous electrolytic solution comprises a phosphate compound represented by the following general formula (1);

$$O=P(O-R_1)(O-R_2)(O-R_3) \qquad (1)$$

wherein $R_1$, $R_2$, and $R_3$ are each independently alkyl group, alkenyl group, alkynyl group, or a group comprising an ether bond represented by $-R_4-O-R_5$ in which $R_4$ represents alkylene group and $R_5$ represents alkyl group, and $R_1$ to $R_5$ may each independently have a substituent,
at least one of $R_1$, $R_2$, and $R_3$ is a group comprising an ether bond represented by $-R_4-O-R_5$, and
at least one of $R_1$, $R_2$, and $R_3$ contains fluorine, and
the positive electrode active material has a charge and discharge region of 4.5 V or more versus lithium.

Advantageous Effect of Invention

According to the present embodiment, there is provided a lithium secondary battery having improved life characteristics; the battery comprising a positive electrode active material capable of operating at a high potential of 4.5 V or more versus lithium.

DESCRIPTION OF EMBODIMENT

A secondary battery (preferably a lithium ion secondary battery) in this embodiment comprises a nonaqueous electrolytic solution comprising a phosphate compound represented by the following general formula (1), and a positive electrode having a positive electrode active material having a charge and discharge region of 4.5 V or more versus lithium.

$$O=P(O-R_4)(O-R_2)(O-R_3) \quad (1)$$

wherein $R_1$, $R_2$, and $R_3$ are each independently alkyl group, alkenyl group, alkynyl group, or a group comprising an ether bond represented by —$R_4$—O—$R_5$ ($R_4$ represents alkylene group, and $R_5$ represents alkyl group), $R_1$ to $R_5$ may each independently have a substituent, at least one of $R_1$, $R_2$, and $R_3$ is a group comprising an ether bond represented by —$R_4$—O—$R_5$, and at least one of $R_1$, $R_2$, and $R_3$ contains fluorine.

(Nonaqueous Electrolytic Solution)

The nonaqueous electrolytic solution in this embodiment comprises a fluorine-containing phosphate compound having ether group represented by general formula (1). Because the phosphate compound comprises a fluorine atom, the oxidation resistance increases, and the oxidation reaction in the positive electrode can be suppressed, which makes the use in a high voltage battery possible. In addition, it is considered that because the phosphate compound has ether group, the stability of the film formed on the electrode surface increases.

In the above general formula (1), $R_1$, $R_2$, and $R_3$ are each independently alkyl group, alkenyl group, alkynyl group, or a group comprising an ether bond represented by —$R_4$—O—$R_5$ ($R_4$ represents alkylene group, and $R_5$ represents alkyl group), $R_1$ to $R_5$ may each independently have a substituent, at least one of $R_1$, $R_2$, and $R_3$ is a group comprising an ether bond represented by —$R_4$—O—$R_5$, and at least one of $R_1$, $R_2$, and $R_3$ contains fluorine. The alkyl group may be linear or branched. "Containing fluorine" means that at least one of the hydrogen atoms of the corresponding unsubstituted alkyl group, alkenyl group, alkynyl group, or group comprising an ether bond represented by —$R_4$—O—$R_5$ is replaced by a fluorine atom, and the fluorine replacement position is arbitrary.

In the above general formula (1), the numbers of carbon atoms of $R_1$, $R_2$, and $R_3$ are each independently preferably 1 or more and 6 or less, more preferably 1 or more and 5 or less. When the numbers of carbon atoms of $R_1$, $R_2$, and $R_3$ are each 6 or less, an increase in the viscosity of the electrolytic solution is suppressed, and the electrolytic solution easily penetrates into the pores in the electrodes and the separator, and at the same time, the ionic conductivity is improved, and the current value in the charge and discharge characteristics of the battery is good.

In general formula (1), for $R_1$, $R_2$, and $R_3$, for example, it is preferred that, among $R_1$, $R_2$, and $R_3$, two are fluorine-containing alkyl groups, and one is a substituted or unsubstituted group comprising an ether bond represented by —$R_4$—O—$R_5$, it is more preferred that, among $R_1$, $R_2$, and $R_3$, two are fluorine-containing alkyl groups, and one is a group comprising an ether bond represented by —$R_4$—O—$R_5$, and $R_5$ is a fluorine-containing alkyl group, and it is further preferred that, among $R_1$, $R_2$, and $R_3$, two are the same fluorine-containing alkyl groups.

In general formula (1), $R_1$, $R_2$, $R_3$, and $R_5$ are each independently preferably a fluorine-containing alkyl group or an unsubstituted alkyl group, examples of the fluorine-containing alkyl group include —$CF_3$, —$C_2F_5$, —$C_3F_7$, —$CH_2CH_2F$, —$CF_2CH_3$, —$CH_2CF_3$, —$CH_2CHF_2$, —$CH_2CH_2CF_3$, and —$CH_2C_3F_7$, examples of the unsubstituted alkyl group include —$CH_3$, —$C_2H_5$, and —$C_3H_7$, and among these, —$CH_2CF_3$, —$CH_2CH_2F$, and —$CF_3$ are preferred.

In general formula (1), when any of $R_1$, $R_2$, and $R_3$ is alkenyl group, examples of the alkenyl group include vinyl group, allyl group, 1-propenyl group, isopropenyl group, 3-butenyl group, 1-methyl-1-propenyl group, 1-methyl-2-propenyl group, 2-methyl-2-propenyl group, 1-butenyl group, and 2-butenyl group. In addition, in general formula (1), when any of $R_1$, $R_2$, and $R_3$ is alkynyl group, examples of the alkynyl group include ethynyl group, propargyl group, 2-butynyl group, and 3-butynyl group.

$R_4$ is a substituted or unsubstituted alkylene group, and examples thereof include methylene group, ethylene group, 1,2-propylene group, 1,3-propylene group, and alkylene group in which at least one of the hydrogen atoms of these groups is replaced by fluorine (for example, —$CH_2CF_2$—).

In addition, in the compound represented by general formula (1), in the total number of hydrogen atoms and fluorine atoms included in $R_1$, $R_2$, and $R_3$, the proportion of fluorine atoms is preferably 30% or more, and fluorine atoms may be 100%. When the content of fluorine atoms is high, the voltage resistance is further improved, and also in a high voltage battery, or a battery that has been operated at high temperature for a long period, the oxidation reaction of the electrolytic solution on the positive electrode side can be suppressed.

In addition, in general formula (1), $R_1$, $R_2$, and $R_3$ may have a substituent in addition to a fluorine atom. Examples of the substituent include at least one selected from the group consisting of amino group, carboxy group, hydroxy group, cyano group, and halogen atoms (for example, a chlorine atom and a bromine atom). The concept of the above numbers of carbon atoms of $R_1$, $R_2$, and $R_3$ also includes that of the substituent.

Examples of the compound represented by general formula (1) include

$$O=P(O-CH_2CF_3)_2(O-C_2H_4-O-CH_2CF_3);$$

$$O=P(O-CH_2CF_3)_2(O-C_2H_4-O-CF_3);$$

$$O=P(O-CH_2CF_3)(O-C_2H_4-O-CH_2CH_2F)_2;$$

$$O=P(O-CH_2CF_3)_2(O-C_2H_4-O-CH_2CH_2F);$$

$$O=P(O-CH_2C_3F_7)_2(O-C_2H_4-O-CH_2C_3F_7);$$
and $$O=P(O-CH_2CF_3)_2(O-CH_2CF_2-O-CF_3).$$

Among these, $$O=P(O-CH_2CF_3)_2(O-C_2H_4-O-CH_2CF_3)$$

is preferred because the effect of suppressing electrolytic solution decomposition at high potential is large, the film formation effect is large, and the oxidation resistance is high. One of the phosphate compounds represented by general formula (1) may be used alone, or two or more of the phosphate compounds represented by general formula (1) may be used in combination.

The phosphate compound represented by general formula (1) is obtained, for example, by the dehydration condensation reaction of phosphoric acid and a fluorine-containing alcohol having ether group.

The content of the phosphate compound represented by general formula (1) is not particularly limited and is preferably 0.01 to 5% by mass, more preferably 0.02 to 3% by mass, and further preferably 0.05 to 1% by mass, in the nonaqueous electrolytic solution. When the content of the phosphate compound represented by general formula (1) is 0.01% by mass or more in the nonaqueous electrolytic solution, the effect of increasing the life of the battery by a film formation effect is further improved. When the content is 5% by mass or less, the ionic conductivity of the electrolytic solution is improved, and the charge and discharge rate of the battery is better.

The nonaqueous electrolytic solution may further comprise a cyclic carbonate (including a fluorine-containing compound), an open-chain carbonate (including a fluorine-containing compound), an open-chain ether (including a fluorine-containing compound), a cyclic ether (including a fluorine-containing compound), an open-chain carboxylate (including a fluorine-containing compound), a cyclic carboxylate (including a fluorine-containing compound), a phosphate (including a fluorine-containing compound) other than the compound represented by general formula (1), and the like in addition to the phosphate compound represented by general formula (1).

The cyclic carbonate has a large relative dielectric constant, and therefore, the addition thereof improves the dissociation properties of the supporting salt, and sufficient conductivity is easily provided. In addition, an advantage of the open-chain carbonate, the fluorinated ether, the fluorinated carboxylate, the fluorinated carbonate, and the like is that the addition thereof lowers the viscosity of the electrolytic solution, and therefore, the ion mobility in the electrolytic solution is improved. In addition, the cyclic carbonate (including a fluorine-containing compound), the open-chain carbonate (including a fluorine-containing compound), the fluorinated ether, the fluorinated carboxylate, the fluorinated carbonate, and the fluorinated phosphate have high voltage resistance and conductivity and therefore are more suitable for mixing with the compound represented by general formula (1) containing fluorine and having two or more ether groups.

The cyclic carbonate is not particularly limited. Examples thereof may include ethylene carbonate (EC), propylene carbonate (PC), butylene carbonate (BC), or vinylene carbonate (VC). In addition, the cyclic carbonate includes a fluorinated cyclic carbonate. Examples of the fluorinated cyclic carbonate include compounds obtainable by replacing some or all hydrogen atoms of ethylene carbonate (EC), propylene carbonate (PC), butylene carbonate (BC), vinylene carbonate (VC), or the like by fluorine atoms. More specifically, as the fluorinated cyclic carbonate, 4-fluoro-1,3-dioxolan-2-one, (cis or trans)4,5-difluoro-1,3-dioxolan-2-one, 4,4-difluoro-1,3-dioxolan-2-one, 4-fluoro-5-methyl-1,3-dioxolan-2-one, or the like may be used. Among those listed above, from the viewpoint of voltage resistance and conductivity, ethylene carbonate, propylene carbonate, or compounds obtainable by fluorinating parts of these, or the like is preferred, and ethylene carbonate is more preferred. One cyclic carbonate may be used alone, or two or more cyclic carbonates may be used in combination.

The content of the cyclic carbonate is preferably 1 to 70% by volume, more preferably 2 to 50% by volume, and further preferably 5 to 40% by volume, in the nonaqueous electrolytic solution from the viewpoint of the effect of increasing the degree of dissociation of the supporting salt, and the effect of increasing the conductivity of the electrolytic solution.

The open-chain carbonate is not particularly limited. Examples thereof include dimethyl carbonate (DMC), ethyl methyl carbonate (EMC), diethyl carbonate (DEC), and dipropyl carbonate (DPC). In addition, the open-chain carbonate includes a fluorinated open-chain carbonate. Examples of the fluorinated open-chain carbonate include compounds obtainable by replacing some or all hydrogen atoms of ethyl methyl carbonate (EMC), dimethyl carbonate (DMC), diethyl carbonate (DEC), dipropyl carbonate (DPC), and the like by fluorine atoms. More specifically, examples of the fluorinated open-chain carbonate include bis(fluoroethyl) carbonate, 3-fluoropropyl methyl carbonate, and 3,3,3-trifluoropropyl methyl carbonate. Among these, dimethyl carbonate and diethyl carbonate are preferred from the viewpoint of voltage resistance and conductivity. One open-chain carbonate may be used alone, or two or more open-chain carbonates may be used in combination.

The open-chain carbonate is effective in lowering the viscosity of the electrolytic solution and can increase the conductivity of the electrolytic solution. From these viewpoints, the content of the open-chain carbonate is preferably 0.1 to 90% by volume, more preferably 0.2 to 80% by volume, and further preferably 0.5 to 70% by volume, in the nonaqueous electrolytic solution.

The carboxylate is not particularly limited. Examples thereof include ethyl acetate, methyl propionate, ethyl formate, ethyl propionate, methyl butyrate, ethyl butyrate, methyl acetate, and methyl formate. In addition, the carboxylate includes a fluorinated carboxylate. Examples of the fluorinated carboxylate include compounds obtainable by replacing some or all hydrogen atoms of ethyl acetate, methyl propionate, ethyl formate, ethyl propionate, methyl butyrate, ethyl butyrate, methyl acetate, or methyl formate by fluorine atoms. Specific examples thereof include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl Tetrafluoro-2-(methoxy)propionate, 3,3,3trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, and ethyl trifluoroacetate. Among these, ethyl propionate, methyl acetate, methyl 2,2,3,3-tetrafluoropropionate, 2,2,3,3-tetrafluoropropyl trifluoroacetate, and the like are preferred from the viewpoint of voltage resistance, the boiling point, and the like. The carboxylate is effective in reducing the viscosity of the electrolytic solution like the open-chain carbonate. Therefore, for example, the carboxylate may be used instead of the open-chain carbonate and may also be used in combination with the open-chain carbonate.

The content of the carboxylate is preferably 0.1 to 50% by volume, more preferably 0.2 to 20% by volume, and further preferably 0.5 to 15% by volume, in the nonaqueous electrolytic solution. By setting the content of the carboxylate to 0.1% by volume or more, the low temperature characteristics can be further improved, and the conductivity can be further improved. In addition, by setting the content of the carboxylate to 50% by volume or less, too high vapor pressure when the battery is left at high temperature can be reduced.

The open-chain ether is not particularly limited. Examples thereof include 1,2-ethoxyethane (DEE) or ethoxymethoxyethane (EME). In addition, a fluorinated open-chain ether obtainable by replacing part of the hydrogen of a open-chain ether by fluorine has high oxidation resistance and is preferred for a positive electrode operating at high potential. Examples of the fluorinated open-chain ether include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,1,2,3,3-Hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H,1H,2'H-perfluorodipropyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H,1H,2'H-perfluorodipropyl ether, heptafluoropropyl 1,2,2,2-tetrafluoroethyl ether, 1,1,2,2-tetrafluoroethyl-2,2,3,3-tetrafluoropropyl ether, 2,2,3,3,3-pentafluoropropyl-1,1,2,2-tetrafluoroethyl ether, ethyl nonafluorobutyl ether, and methyl nonafluorobutyl ether. Among these, 2,2,3,3,3-pentafluoropropyl 1,1,2,2-tetrafluoroethyl ether, 1H,1H,2'H-perfluorodipropyl ether, 1H,1H,2'H,3H-decafluorodipropyl ether, 1,1,2,2-tetrafluoroethyl 2,2,3,3-tetrafluoropropyl ether are preferred from the viewpoint of voltage resistance, the boiling point, and the like. The open-chain ether is effective in reducing the viscosity of the electrolytic solution like the open-chain carbonate. Therefore, for example, the open-chain ether may be used instead of the open-chain carbonate and the carboxylate and may also be used in combination with the open-chain carbonate and the carboxylate.

The content of the open-chain ether is preferably 0.1 to 70% by volume, more preferably 0.2 to 60% by volume, and further preferably 0.5 to 50% by volume, in the nonaqueous electrolytic solution. By setting the content of the open-chain ether to 0.1% by volume or more, the low temperature characteristics can be further improved, and the conductivity can be further improved. In addition, by setting the content of the open-chain ether to 50% by volume or less, too high vapor pressure when the battery is left at high temperature can be reduced.

The nonaqueous electrolytic solution may comprise a phosphate or a fluorine-containing phosphate other than the phosphate compound represented by the above general formula (1). Examples of the phosphate include trimethyl phosphate, triethyl phosphate, and tributyl phosphate. Examples of the fluorine-containing phosphate include 2,2,2-trifluoroethyl dimethyl phosphate, bis(trifluoroethyl) methyl phosphate, bis trifluoroethyl ethyl phosphate, tris (trifluoromethyl)phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl)phosphate, tris(2,2,3,3,3-pentafluoropropyl)phosphate, tris(2,2,2-trifluoroethyl)phosphate (hereinafter, also abbreviated as TTFEP), tris(1H,1H-heptafluorobutyl)phosphate, and tris(1H,1H,5H-octafluoropentyl)phosphate. Among these, tris(2,2,2-trifluoroethyl)phosphate represented by the following formula (6) is preferred because the effect of suppressing electrolytic solution decomposition at high potential is large. One fluorine-containing phosphate may be used alone, or two or more fluorine-containing phosphates may be used in combination.

(6)

The nonaqueous electrolytic solution may comprise the following in addition to the above. The nonaqueous electrolytic solution may comprise, for example, γ-lactones, such as γ-butyrolactone, and cyclic ethers, such as tetrahydrofuran, 2-methyltetrahydrofuran, and 2,2-dimethyltetrahydrofuran. In addition, the nonaqueous electrolytic solution may comprise aprotic organic solvents, such as dimethyl sulfoxide, 1,3-dioxolane, formamide, acetamide, dimethylformamide, dioxolane, acetonitrile, propynonitrile, nitromethane, ethyl monoglyme, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone. In addition, the examples include those in which some or all hydrogen elements of these compounds are replaced by fluorine.

Examples of the supporting salt include lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiN(CF_3SO_2)_2$, $LiN(C_2F_5SO_2)_2$, and $LiB_{10}Cl_{10}$. In addition, examples of other supporting salts include lithium lower aliphatic carboxylates, chloroborane lithium, lithium tetraphenylborate, LiBr, LiI, LiSCN, and LiCl. One supporting salt may be used alone, or two or more supporting salts may be used in combination.

An ion-conducting polymer may be added to the nonaqueous electrolytic solution. Examples of the ion-conducting polymer include polyethers, such as polyethylene oxide and polypropylene oxide, and polyolefins, such as polyethylene and polypropylene. In addition, examples of the ion-conducting polymer include polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonates, polyethylene terephthalate, polyhexamethylene adipamide, polycaprolactam, polyurethanes, polyethylenimine, polybutadiene, polystyrene, or polyisoprene, or derivatives thereof. One ion-conducting polymer may be used alone, or two or more ion-conducting polymers may be used in combination. In addition, polymers comprising various monomers forming the above polymers may be used.

(Positive Electrode)

In the present embodiment, the positive electrode of the lithium secondary battery comprises a positive electrode active material capable of absorbing and desorbing lithium ions at a potential of 4.5 V or more versus lithium metal (hereinafter sometimes described as a "positive electrode active material operating at high potential") from the viewpoint of obtaining high energy density.

For this positive electrode active material, one in which at least the charge curve of its charge and discharge curves has a region of 4.5 V or more versus lithium metal at least in part can be used. In other words, an active material having a region of 4.5 V or more versus lithium metal at least in part in only the charge curve, or an active material having a region of 4.5 V or more versus lithium metal at least in part in both the charge curve and the discharge curve can be used.

As the measurement conditions of these charge and discharge curves, the charge and discharge current can be set to 5 mA/g per mass of the positive electrode active material, the charge termination voltage can be set to 5.2 V, and the discharge termination voltage can be set to 3 V.

Examples of such a positive electrode active material operating at high potential include spinel-based materials, layered materials, and olivine-based materials.

Examples of the spinel-based materials include $LiNi_{0.5}Mn_{1.5}O_4$; and those obtainable by replacing part of this material by other elements to increase life, i.e. $LiNi_xMn_{2-x-y}M_yO_4$ (0.4<x<0.6, M includes at least one selected from Li, Al, B, Mg, Si, transition metals, and the like, and 0<y<0.5).

Particularly, wherein 0.4<x<1.1, 0≤y, x+y<2, 0≤a≤1.2, and 0≤w≤1; M is at least one selected from the group consisting of Co, Ni, Fe, Cr, and Cu; Y is at least one selected from the group consisting of Li, B, Na, Al, Mg, Ti, Si, K, and Ca; and Z is at least one selected from the group consisting of F and Cl, is preferred in that it operates at a high voltage such as 4.5 V or more and has high energy density.

The layered materials are represented by the general formula $LiMO_2$. Specific examples thereof are $LiNi_{1-x}M_xO_2$ (M is an element including at least Co or Al, and 0.05<x<0.7) and the like.

wherein 0.7≥z≥0.33, and M is at least one of Li, Co, and Ni, and wherein 0.3>x≥0.1, 0.7≥z≥0.33, and M is at least one of Co, Fe, and Ni, and the like are preferred in that they operate at a high voltage such as 4.5 V or more versus lithium and have high energy density.

The olivine-based materials are represented by the general formula $LiMPO_4$. Specific examples thereof include $LiFePO_4$, $LiMnPO_4$, and $LiCoPO_4$. Those obtainable by replacing parts of these by another element or replacing the oxygen moiety by fluorine can also be used.

wherein M is at least one of Co and Ni, is preferred in that it operates at a high voltage such as 4.5 V or more versus lithium and has high energy density.

In addition, in addition to the above positive electrode active material capable of absorbing and desorbing lithium ions at a potential of 4.5 V or more versus lithium metal, other positive electrode active materials may be used in combination. Examples of the other positive electrode active materials include $LiMn_{2-x}M_xO_4$ (0<x<0.3, and M includes at least one selected from Li, Al, B, Mg, Si, transition metals, and the like) operating around 4 V versus lithium obtainable by replacing part of the Mn of $LiMn_2O_4$ to increase life, and $LiCoO_2$.

In addition to these, a NASICON type, lithium transition metal silicon composite oxides, and the like may be used.

When the positive electrode active material operating at high potential and other positive electrode active materials are used in combination, the content of the above positive electrode active material operating at high potential in the entire positive electrode active material is preferably 60% by mass or more, more preferably 80% by mass or more, and further preferably 90% by mass or more.

The specific surface area of these positive electrode active materials is, for example, 0.01 to 5 m²/g, preferably 0.05 to 4 m²/g, more preferably 0.1 to 3 m²/g, and further preferably 0.2 to 2 m²/g. By setting the specific surface area in such a range, the contact area with the electrolytic solution can be adjusted in an appropriate range. In other words, by setting the specific surface area to 0.01 m²/g or more, the insertion and desorption of lithium ions are easily smoothly performed, and the resistance can be further reduced. In addition, by setting the specific surface area to 5 m²/g or less, the acceleration of the decomposition of the electrolytic solution and the dissolution of the constituent elements of the active material can be further suppressed.

The median particle diameter of the above lithium manganese composite oxide is preferably 0.01 to 50 μm, more preferably 0.02 to 40 μm. By setting the particle diameter to 0.01 μm or more, preferably to 0.02 μm or more, the dissolution of the constituent elements of the positive electrode material can be further suppressed, and deterioration due to contact with the electrolytic solution can be further suppressed. In addition, by setting the particle diameter to 50 μm or less, the insertion and desorption of lithium ions are easily smoothly performed, and the resistance can be further reduced. The evaluation can be measured by a laser diffraction scattering type particle size distribution measuring apparatus.

As the positive electrode binder, one similar to the negative electrode binder can be used. Especially, polyvinylidene fluoride (PVdF) is preferred from the viewpoint of versatility and low cost. The amount of the positive electrode binder used is preferably 1 to 10 parts by mass based on 100 parts by mass of the positive electrode active material from the viewpoint of sufficient binding force and an increase in energy in a trade-off relationship. Examples of the other materials include vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimides, and polyamideimides.

The positive electrode current collector is not particularly limited, and aluminum, nickel, copper, silver, iron, and alloys thereof are preferred because of electrochemical stability. Examples of its shape include foil, a flat plate shape, and a mesh shape.

A conductive auxiliary material may be added to the positive electrode active material layer comprising the positive electrode active material for the purpose of decreasing impedance. Examples of the conductive auxiliary material include carbonaceous fine particles, such as graphite, carbon black, and acetylene black.

(Negative Electrode)

The negative electrode is not particularly limited as long as it comprises, as the negative electrode active material, a material capable of absorbing and desorbing lithium.

The negative electrode active material is not particularly limited. Examples thereof include a carbon material capable of absorbing and desorbing lithium ions (a), a metal capable of being alloyed with lithium (b), or a metal oxide capable of absorbing and desorbing lithium ions (c).

As the carbon material (a), graphite, amorphous carbon, diamond-like carbon, carbon nanotubes, or composites thereof can be used. Graphite having high crystallinity has high electrical conductivity and has excellent adhesiveness to a negative electrode current collector formed of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily. The carbon material (a) can be used alone or in combination with other materials. The carbon material (a) may be used alone or in combination with other materials, and their content is preferably in the range of 2% by mass or more and 80% by mass or less in the negative electrode active material, more preferably in the range of 2% by mass or more and 30% by mass or less.

As the metal (b), a metal mainly composed of Al, Si, Pb, Sn, Zn, Cd, Sb, In, Bi, Ag, Ba, Ca, Hg, Pd, Pt, Te, La, and the like, or alloys comprising two or more of these, or alloys of these metals or alloys with lithium, or the like can be used. Particularly, the metal (b) preferably comprises silicon (Si). The metal (b) may be used alone or in combination with other materials and their content is preferably in the range of 5% by mass or more and 90% by mass or less in the negative electrode active material, more preferably in the range of 20% by mass or more and 50% by mass or less.

As the metal oxide (c), silicon oxide, aluminum oxide, tin oxide, indium oxide, zinc oxide, lithium oxide, or composites thereof can be used. Particularly, the metal oxide (c) preferably comprises silicon oxide. This is because silicon oxide is relatively stable and does not easily cause reactions with other compounds. In addition, one or two or more elements selected from among nitrogen, boron, and sulfur can also be added to the metal oxide (c), for example, in an amount of 0.1 to 5% by mass. By doing this, the electrical conductivity of the metal oxide (c) is improved. The metal oxide (c) may be used alone or in combination with other materials, and its content is preferably in the range of 5% by mass or more and 90% by mass or less in the negative electrode active material, more preferably in the range of 40% by mass or more and 70% by mass or less.

Specific examples of the metal oxide (c) include $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ $(1 \leq x \leq 4/3)$, $PbO_2$, and $Pb_2O_5$.

In addition, the negative electrode active materials may include, for example, a metal sulfide capable of absorbing and desorbing lithium ions. Examples of the metal sulfide include $SnS$ and $FeS_2$. In addition, examples of the negative electrode active material can include metal lithium or lithium alloys, polyacene or polythiophene, or lithium nitride, such as $Li_5(Li_3N)$, $Li_7MnN_4$, $Li_3FeN_2$, $Li_{2.5}Co_{0.5}N$, or $Li_3CoN$.

The above negative electrode active materials may be used alone, or two or more of the above negative electrode active materials may be mixed and used. The negative electrode active material preferably has an average particle diameter of 0.1 μm or more and 50 μm or less. This is because when the average particle diameter is too small, electrode coating is difficult, and when the average particle diameter is too large, the unevenness of the electrode increases, and the flatness of the electrode is not maintained.

The mass ratio of the negative electrode active material in the negative electrode is preferably 70% by mass or more and 99.5% by mass or less. When the mass ratio is too large, the amounts of the negative electrode binder and the like decrease, and therefore, problems, such as the peeling of the electrode, occur. A too small mass ratio is disadvantageous in terms of energy density. The mass ratio is more preferably 80% by mass or more and 99% by mass or less.

The negative electrode binder is not particularly limited. Examples thereof include polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

The content of the negative electrode binder is preferably in the range of 0.5 to 30% by mass, more preferably 1 to 25% by mass, based on the total amount of the negative electrode active material and the negative electrode binder. By setting the content to 0.5% by mass or more, the adhesiveness between the active materials or between the active material and the current collector is improved, and the cycle characteristics are good. In addition, by setting the content to 30% by mass or less, the active material ratio is improved, and the negative electrode capacity can be improved.

The negative electrode current collector is not particularly limited, and copper, nickel, aluminum, silver, and alloys thereof are preferred because of electrochemical stability. Examples of its shape include foil, a flat plate shape, and a mesh shape.

The negative electrode can be made by forming a negative electrode active material layer comprising a negative electrode active material and a negative electrode binder on a negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode current collector.

(Separator)

The secondary battery may consist of a combination of a positive electrode, a negative electrode, a separator, and a nonaqueous electrolyte as its configuration. Examples of the separator include woven fabrics, nonwoven fabrics, porous polymer films of polyolefins, such as polyethylene and polypropylene, polyimides and porous polyvinylidene fluoride films, and the like, or ion-conducting polymer electrolyte films. These may be used alone or in combination.

(Shape of Battery)

Examples of the shape of the battery include a cylindrical shape, a rectangular shape, a coin type, a button type, and a laminate type. Examples of the package of the battery include stainless, iron, aluminum, titanium, or alloys thereof, or plated articles thereof. As the plating, for example, nickel plating may be used. When the battery is a laminate type, a laminate resin film is preferred as the package.

Examples of the laminate resin film used in a laminate type include aluminum, aluminum alloy, and titanium foil. Examples of the material of the thermally bondable portion of the metal laminate resin film include thermoplastic polymer materials, such as polyethylene, polypropylene, and polyethylene terephthalate. In addition, each of the numbers of the metal laminate resin films and the metal foil layers is not limited to one and may be two or more.

EXAMPLES

Figure 1:
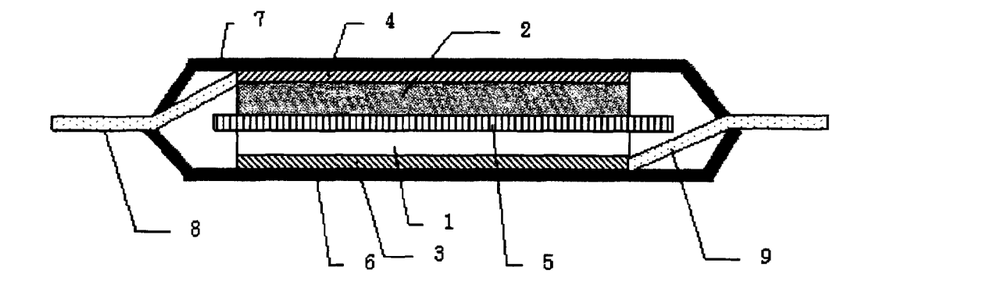
FIG. 1 is one example of a diagram showing the cross-sectional structure of a secondary battery according to the present embodiment.

Specific examples according to the present invention will be described below, but the present invention is not limited to these Examples and can be carried out by making appropriate changes without departing from the spirit thereof. FIG. 1 is a schematic diagram showing the configuration of a lithium secondary battery made in these Examples.

As shown in FIG. 1, a lithium secondary battery comprises a positive electrode active material layer 1 containing a positive electrode active material on a positive electrode current collector 3 formed of a metal, such as aluminum foil, and a negative electrode active material layer 2 containing a negative electrode active material on a negative electrode current collector 4 formed of a metal, such as copper foil. The positive electrode active material layer 1 and the negative electrode active material layer 2 are disposed opposed to each other via an electrolytic solution and a separator 5 formed of a nonwoven fabric, a polypropylene microporous film, or the like comprising the electrolytic solution. In FIG. 1, reference numerals 6 and 7 denote a package, reference numeral 8 denotes a negative electrode tab, and reference numeral 9 denotes a positive electrode tab.

Example 1

$LiNi_{0.5}Mn_{1.5}O_4$ (90% by mass) as a positive electrode active material, polyvinylidene fluoride (5% by mass) as a binder, and carbon black (5% by mass) as a conductive agent were mixed to prepare a positive electrode mixture. The positive electrode mixture was dispersed in N-methyl-2-pyrrolidone to prepare a positive electrode slurry. One surface of a 20 μm thick aluminum current collector was uniformly coated with this positive electrode slurry. The thickness of the coating film was adjusted so that the initial charge capacity per unit area was 2.5 mAh/cm². The coated current collector was dried and then compression-shaped by a roll press to make a positive electrode.

As a negative electrode active material, synthetic graphite was used. The synthetic graphite was dispersed in N-methylpyrrolidone in which PVDF is dissolved, to prepare a negative electrode slurry. The mass ratio of the negative electrode active material to the binder was 90/10. A 10 μm thick Cu current collector was uniformly coated with this negative electrode slurry. The thickness of the coating film was adjusted so that the initial charge capacity was 3.0 mAh/cm². The coated current collector was dried and then compression-shaped by a roll press to make a negative electrode.

The positive electrode and the negative electrode cut into 3 cm×3 cm were disposed so as to be opposed to each other via a separator. For the separator, a 25 μm thick microporous polypropylene film was used.

As the nonaqueous electrolytic solution, a solution obtained by mixing ethylene carbonate (EC), tris(2,2,2-trifluoroethyl)phosphate (TTFEP), and 1,1,2,2-tetrafluoroethyl 2,2,3,3-tetrafluoropropyl ether at a volume ratio of 30/50/20 was used. $LiPF_6$ was dissolved in this nonaqueous electrolytic solution at a concentration of 0.9 mol/l, and further, 0.01% by mass of an electrolytic solution additive (Sample 1) represented by the following formula:

$$O=P(O-CH_2CF_3)_2(O-C_2H_4-O-CH_2CF_3) \quad \text{(Sample 1)}$$

was added in the electrolytic solution to prepare a nonaqueous electrolytic solution.

The above positive electrode, negative electrode, separator, and electrolytic solution were disposed in a laminate package, and the laminate was sealed to make a lithium secondary battery. The positive electrode and the negative electrode were brought into a state in which tabs were connected and the positive electrode and the negative electrode were electrically connected from the outside of the laminate.

This battery was charged at 20 mA, and after the upper limit voltage reached 4.8 V, the battery was charged at constant voltage until the total charge time reached 2.5 hours. Then, the battery was discharged at 20 mA at constant current until a lower limit voltage of 3 V was reached. This charge and discharge was repeated 100 times. The cell was disposed in a thermostat chamber at 45° C., and charge and discharge were carried out. The result of the ratio between discharge capacity in the 1st cycle and discharge capacity in the 100th cycle (capacity retention ratio) is shown in Table 1.

Examples 2 to 10 and Comparative Examples 1 to 2

Lithium secondary batteries were manufactured and evaluated as in Example 1 except that the type and amount of the additive added to the nonaqueous electrolytic solution were changed as shown in Table 1. The chemical formulae of electrolytic solution additives described in Table 1 are as follows.

$$O=P(O-CH_2CF_3)_2(O-C_2H_4-O-CH_2CF_3), \quad \text{(Sample 1)}$$

$$O=P(O-C_2H_5)_2(O-C_2H_4-O-CH_2C_2H_5), \quad \text{(Sample 2)}$$

$$O=P(O-CH_2CF_3)_2(O-CH_2CF_2-O-CF_3), \quad \text{(Sample 3)}$$

$$O=P(O-CH_2CF_3)_2(O-C_2H_4-O-CH_2CH_2F) \quad \text{(Sample 4)}$$

TABLE 1

| | Additive | Amount of additive added in electrolytic solution (% by mass) | Capacity retention ratio after 100 cycles at 45° C. |
|---|---|---|---|
| Comp. Ex. 1 | none | 0 | 75% |
| Example 1 | Sample1 | 0.01 | 77% |
| Example 2 | Sample1 | 0.02 | 78% |
| Example 3 | Sample1 | 0.05 | 81% |
| Example 4 | Sample1 | 0.1 | 85% |
| Example 5 | Sample1 | 0.2 | 85% |

TABLE 1-continued

|  | Additive | Amount of additive added in electrolytic solution (% by mass) | Capacity retention ratio after 100 cycles at 45° C. |
|---|---|---|---|
| Example 6 | Sample1 | 0.5 | 85% |
| Example 7 | Sample1 | 2 | 83% |
| Example 8 | Sample1 | 5 | 81% |
| Comp. Ex. 2 | Sample2 | 0.1 | 69% |
| Example 9 | Sample3 | 0.1 | 84% |
| Example 10 | Sample4 | 0.1 | 80% |

Comp. Ex. = Comparative Example

As shown in Table 1, it was seen that by adding a phosphate containing fluorine and having an ether bond, the cycle characteristics were improved. In addition, it was confirmed that the amount added was effective at least in the range of 0.01% by mass or more and 5% by mass or less. In the case of Comparative Example 2, the capacity retention ratio decreased, and it is considered that because the positive electrode active material having high operating potential was used, the additive containing no fluorine atom (Sample 2) reacted on the positive electrode side, and the capacity decreased. Therefore, it is considered that in the positive electrode active material operating at high voltage, if a fluorine element is contained in the additive, the oxidation resistance was improved and the effect of improving life characteristics was obtained. It is considered that in this manner, when the compound represented by general formula (1) is included in a nonaqueous electrolytic solution in a lithium secondary battery comprising a positive electrode containing a positive electrode active material such as operating at 4.5 V or more versus lithium, the life improvement effect increases.

Comparative Example 3 and Example 11

Lithium secondary batteries were manufactured and evaluated as in Example 1 except that $Li(Li_{0.15}Ni_{0.2}Co_{0.1}Mn_{0.55})O_2$ was used as the positive electrode active material, and further, the type and amount of the additive added to the nonaqueous electrolytic solution were changed as shown in Table 2. The result is shown in Table 2.

Comparative Example 4 and Example 12

Lithium secondary batteries were manufactured and evaluated as in Example 1 except that $LiCoPO_4$ was used as the positive electrode active material, the type and amount of the additive added to the nonaqueous electrolytic solution were changed as shown in Table 2, and further, the charge voltage and the discharge voltage were set to 5.0 V and 3.0 V, respectively. The result is shown in Table 2.

TABLE 2

|  | Positive electrode active material | Additive | Amount of additive added in electrolytic solution (% by mass) | Capacity retention ratio |
|---|---|---|---|---|
| Comp. Ex. 3 | $Li(Li_{0.15}Ni_{0.2}Co_{0.1}Mn_{0.55})O_2$ | none | 0 | 57% |
| Example 11 | $Li(Li_{0.15}Ni_{0.2}Co_{0.1}Mn_{0.55})O_2$ | Sample1 | 0.1 | 65% |
| Comp. Ex. 4 | $LiCoPO_4$ | none | 0 | 49% |
| Example 12 | $LiCoPO_4$ | Sample3 | 0.1 | 58% |

As shown in Table 2, a similar effect was obtained despite the positive electrode material was changed.

As shown above, according to the present embodiment, the cycle characteristics can be improved in a lithium secondary battery having high operating voltage and high energy density. In addition, the cycle characteristics at high temperature can also be improved.

REFERENCE SIGNS LIST 1 positive electrode active material layer
2 negative electrode active material layer
3 positive electrode current collector
4 negative electrode current collector
5 separator
6 laminate package
7 laminate package
8 negative electrode tab
9 positive electrode tab

The invention claimed is:

1. A lithium secondary battery comprising a positive electrode comprising a positive electrode active material and a nonaqueous electrolytic solution, wherein
the nonaqueous electrolytic solution comprises a phosphate compound represented by the following general formula (1):

$$O=P(O-R_1)(O-R_2)(O-R_3) \quad (1)$$

wherein among $R_1$, $R_2$, and $R_3$, two are fluorine-containing alkyl groups, and the other is a group comprising an ether bond represented by $-R_4-O-R_5$ in which $R_4$ represents alkylene group and $R_5$ represents a fluorine-containing alkyl group, and $R_1$ to $R_5$ may each independently have a substituent, and
the positive electrode active material has a charge and discharge region of 4.5 V or more versus lithium.

2. The lithium secondary battery according to claim 1, wherein numbers of carbon atoms of $R_1$, $R_2$, and $R_3$ in the general formula (1) are each independently 1 or more and 6 or less.

3. The lithium secondary battery according to claim 1, wherein a proportion of fluorine atoms in a total number of hydrogen atoms and fluorine atoms included in $R_1$, $R_2$, and $R_3$ in the general formula (1) is 30% or more.

4. The lithium secondary battery according to claim 1, wherein the positive electrode active material comprises a lithium metal composite oxide represented by the following formula (2), (3), (4), or (5):

$$Li_a(M_xMn_{2-x-y}Y_y)(O_{4-w}Z_w) \quad (2)$$

wherein $0.4 < x < 1.1$, $0 \leq y$, $x+y<2$, $0 \leq a \leq 1.2$, and $0 \leq w \leq 1$; M is at least one selected from the group consisting of Co, Ni, Fe, Cr, and Cu; Y is at least one selected from the group consisting of Li, B, Na, Al, Mg, Ti, Si, K, and Ca; and Z is at least one selected from the group consisting of F and Cl, LiMPO$_4$ (3)

wherein M is at least one of Co and Ni,

Li(M$_{1-z}$Mn$_z$)O$_2$ (4)

wherein 0.7≥z≥0.33, and M is at least one of Li, Co, and Ni,

Li(Li$_x$M$_{1-x-z}$Mn$_7$)O$_2$ (5)

wherein 0.3>x≥0.1, 0.7≥z≥0.33, and M is at least one of Co, Fe, and Ni.

5. The lithium secondary battery according to claim 1, wherein the phosphate compound represented by the general formula (1) comprises at least one selected from the group consisting of:

O=P(O—CH$_2$CF$_3$)$_2$(O—C$_2$H$_4$—O—CH$_2$CF$_3$);

O=P(O—CH$_2$CF$_3$)$_2$(O—C$_2$H$_4$—O—CF$_3$);

O=P(O—CH$_2$CF$_3$)$_2$(O—C$_2$H$_4$—O—CH$_2$CH$_2$F);

O=P(O—CH$_2$C$_3$F$_7$)$_2$(O—C$_2$H$_4$—O—CH$_2$C$_3$F$_7$); and

O=P(O—CH$_2$CF$_3$)$_2$(O—CH$_2$CF$_2$—O—CF$_3$).

6. The lithium secondary battery according to claim 5, wherein the phosphate compound represented by the general formula (1) comprises at least one selected from the group consisting of:

O=P(O—CH$_2$CF$_3$)$_2$(O—C$_2$H$_4$—O—CH$_2$CF$_3$),

O=P(O—CH$_2$CF$_3$)$_2$(O—CH$_2$CF$_2$—O—CF$_3$), and

O=P(O—CH$_2$CF$_3$)$_2$(O—C$_2$H$_4$—O—CH$_2$CH$_2$F).

7. The lithium secondary battery according to claim 6, wherein the phosphate compound represented by the general formula (1) comprises at least one selected from the group consisting of:

O=P(O—CH$_2$CF$_3$)$_2$(O—C$_2$H$_4$—O—CH$_2$CF$_3$) and

O=P(O—CH$_2$CF$_3$)$_2$(O—CH$_2$CF$_2$—O—CF$_3$).

8. The lithium secondary battery according to claim 1, wherein the nonaqueous electrolytic solution further comprises 50 vol % or more of a fluorine-containing phosphate other than the phosphate compound represented by the general formula (1).

9. The lithium secondary battery according to claim 8, wherein the phosphate compound represented by the general formula (1) is included in the nonaqueous electrolytic solution in the range of 0.01% by mass or more and 1% by mass or less.

10. The lithium secondary battery according to claim 1, wherein the phosphate compound represented by the general formula (1) is included in the nonaqueous electrolytic solution in the range of 0.01% by mass or more and 1% by mass or less.

11. The lithium secondary battery according to claim 1, wherein the phosphate compound represented by the general formula (1) is included in the nonaqueous electrolytic solution in the range of 0.1% by mass or more and 0.5% by mass or less.

12. The lithium secondary battery according to claim 1, wherein the nonaqueous electrolytic solution further comprises tris(2,2,2-trifluoroethyl) phosphate.

13. A method for manufacturing a lithium secondary battery, comprising a step of enclosing in a package a positive electrode having a positive electrode active material having a charge and discharge region of 4.5 V or more versus lithium, a negative electrode, and a nonaqueous electrolytic solution comprising a phosphate compound represented by the following general formula (1):

O=P(O-R$_1$)(O—R$_2$)(O—R$_3$) (1)

wherein among R$_1$, R$_2$, and R$_3$, two are fluorine-containing alkyl groups, and the other is a group comprising an ether bond represented by —R$_4$—O—R$_5$ in which R$_4$ represents alkylene group and R$_5$ represents a fluorine-containing alkyl group, and R$_1$ to R$_5$ may each independently have a substituent.

* * * * *

UNITED STATES PATENT AND TRADEMARK OFFICE
CERTIFICATE OF CORRECTION

PATENT NO. : 10,014,555 B2
APPLICATION NO. : 14/421523
DATED : July 3, 2018
INVENTOR(S) : Noguchi et al.

It is certified that error appears in the above-identified patent and that said Letters Patent is hereby corrected as shown below:

In the Claims

Claim 4, Column 17, Line 8, "$Li(Li_xM_{1-x-z}Mn_7)O_2$ (5)" should read --$Li(Li_xM_{1-x-z}Mn_z)O_2$ (5)--.

Signed and Sealed this
Twentieth Day of November, 2018

Andrei Iancu
*Director of the United States Patent and Trademark Office*